United States Patent
Othmer (10) Patent No.: US 7,272,400 B1
(45) Date of Patent: Sep. 18, 2007

(54) LOAD BALANCING BETWEEN USERS OF A WIRELESS BASE STATION

(75) Inventor: Konstantin Othmer, Mountain View, CA (US)

(73) Assignee: Core Mobility, Inc., Mountain View, CA (US)

( * ) Notice: Subject to any disclaimer, the term of this patent is extended or adjusted under 35 U.S.C. 154(b) by 315 days.

(21) Appl. No.: 10/742,703

(22) Filed: Dec. 19, 2003

(51) Int. Cl.
H04M 1/00 (2006.01)

(52) U.S. Cl. .................. 455/453; 455/450; 455/422.1; 370/338; 370/112.2

(58) Field of Classification Search .............. 455/453, 455/450, 422.1, 456.1–456.6, 445, 426.1, 455/446; 370/338, 112.2; 379/112.02, 112.04
See application file for complete search history.

(56) References Cited

U.S. PATENT DOCUMENTS

| | | | |
|---|---|---|---|
| 5,875,232 A | 2/1999 | Wolf | |
| 5,875,240 A | 2/1999 | Silverman | |
| 6,016,307 A | 1/2000 | Kaplan et al. | |
| 6,028,842 A | 2/2000 | Chapman et al. | |
| 6,144,641 A | 11/2000 | Kaplan et al. | |
| 6,157,614 A | 12/2000 | Pasternak et al. | |
| 6,181,780 B1 | 1/2001 | Finnigan | |
| 6,216,006 B1 | 4/2001 | Scholefield et al. | |
| 6,219,341 B1 | 4/2001 | Varanasi | |
| 6,263,212 B1 * | 7/2001 | Ross et al. .................. 455/466 |
| 6,285,658 B1 | 9/2001 | Packer | |
| 6,292,799 B1 | 9/2001 | Peek et al. | |
| 6,310,889 B1 | 10/2001 | Parsons et al. | |
| 6,324,184 B1 | 11/2001 | Hou et al. | |
| 6,324,271 B1 | 11/2001 | Sawyer et al. | |
| 6,385,449 B2 | 5/2002 | Eriksson et al. | |
| 6,397,059 B1 | 5/2002 | Vance et al. | |
| 6,401,238 B1 | 6/2002 | Brown et al. | |
| 6,453,351 B1 | 9/2002 | Endo | |
| 6,456,594 B1 | 9/2002 | Kaplan et al. | |
| 6,473,404 B1 | 10/2002 | Kaplan et al. | |
| 2001/0012778 A1 * | 8/2001 | Eriksson et al. ............. 455/436 |
| 2002/0077113 A1 * | 6/2002 | Spaling et al. .............. 455/453 |
| 2003/0003921 A1 * | 1/2003 | Laakso ........................ 455/453 |
| 2004/0106412 A1 * | 6/2004 | Laroia et al. ................ 455/448 |
| 2004/0259560 A1 * | 12/2004 | Hosein et al. ........... 455/452.1 |

FOREIGN PATENT DOCUMENTS

EP    1195949 A2    10/2002

* cited by examiner

*Primary Examiner*—Lester G. Kincaid
*Assistant Examiner*—Fred Casca
(74) *Attorney, Agent, or Firm*—Workman Nydegger (57) ABSTRACT

The load in a cell or a cell sector is balanced in the process of sending store and forward messages to multiple recipients located in a single cell or cell sector. When one or more messages are sent over a wireless communication network to one or more recipient devices, information about the identity of the base station and cell sector serving the recipient device(s) is obtained. A current load for the cell or cell sector can also be obtained and used to control the number of simultaneous message transmissions to the cell sector to avoid overloading the sector. Message transmission may be allocated according to predetermined transmission rules for a cell sector or by dynamically allocating message transmission according to fluctuating traffic loads in the cell sector. Accordingly, a first subset of messages may be transmitted to a single recipient, or a single message may be transmitted to a subset of intended recipient devices. Thereafter, message transmission takes place incrementally without overloading the cell or cell sector.

37 Claims, 3 Drawing Sheets

LOAD BALANCING BETWEEN USERS OF A WIRELESS BASE STATION

CROSS-REFERENCE TO RELATED APPLICATIONS

N/A.

BACKGROUND OF THE INVENTION

1. The Field of the Invention

The present invention generally relates to wireless communication networks. More particularly, the present invention relates to balancing traffic load in wireless communication networks to avoid overloading a cell or sector of a cell.

2. The Relevant Technology

Wireless communication networks are today a common means of communication. The demand for wireless services continues to grow, and efficient use of constrained network resources to maximize capacity is of utmost importance to wireless operators. In cellular systems, a geographical area such as a city is divided up into cells. Each cell is served by a base transceiver station, also known as a base station. Often the cell will be further divided into non-overlapping slices called "sectors" to improve capacity. However, in general capacity in cellular systems is still chronically constrained.

As the popularity of wireless telephony and data communication-enabled devices increases, the way in which these devices are used also grows. In addition to the traditional telephone call, one application of wireless technology that continues to gain momentum and popularity is "network-based instant connect communication," an example of which is Nextel's "Push-to-Talk®" system. Network-based instant connect systems are typically implemented using standard voice-over internet protocol (VoIP) technologies or other data communication technologies, where voice data is sent in digital form over data networks. Unlike standard telephone calls, network-based instant connect communication allows a sender to speak to a recipient without the customary procedure of dialing the telephone number and waiting for the recipient to answer. These services combine the convenience of near-instantaneous connection between users with the range and security afforded by a network, making it a very efficient and secure communication method, especially for large workgroups with inter-dependent workers located on sizable, dispersed corporate campuses, large construction sites, warehouses, and manufacturing floors. Once an instant connect session is established over the network, the voice data transmitted from a sender is played on the recipient's device without any action on the part of the recipient, in a manner similar to traditional walkie-talkie communications. This is in contrast to a regular telephone call where the recipient is required to manually respond to a ringing telephone.

Another example of wireless technology that continues to grow in popularity is the multimedia messaging service (MMS). Generally, MMS is a standards-based, store and forward messaging service that lets users of MMS supported wireless devices send and receive enhanced multimedia messages with formatted text, graphics, photos, audio, and video clips. Similarly, other types of store and forward messaging systems, such as "instant voice messaging systems", allow a user to transmit voice data to a recipient without having first attempted to place a phone call to the recipient, which could be disruptive or otherwise undesirable.

In addition to the network traffic load already created by standard telephone calls, network-based instant connect communication, store and forward messaging such as MMS messages, instant voice messages and other similar wireless communication methods further impact the demands on wireless networks. For example, the convenience and speed of network-based instant connect communication can drive heavy usage among numerous users, and store and forward messaging systems such as MMS systems and instant voice messaging systems may support one-to-many communication. In other words, a sender of a store and forward message may send such a message to multiple recipients within the wireless network. As such, a single sender can dramatically increase the load on the wireless network proportional to the number of recipients for which the message is intended. Similarly, a single user receiving numerous store and forward messages can also significantly increase load on the network. The traffic load is further exacerbated if senders and receivers or numerous intended recipients are located within the same cell or cell sector.

Although the increased load of sending, for example, a one-to-many store and forward message may not substantially affect the wireless network as a whole, particular cells or sectors within the wireless communication network may be adversely affected. For instance, if multiple recipients of an intended message are within the same cell sector and traffic load in that sector is already substantial, the increased load in the sector resulting from a one-to-many store and forward message may be beyond the available capacity. Such is the case, e.g., in a large warehouse, corporate campus or construction site where a large number of inter-dependent employees or workers are located within a small geographical location and therefore derive wireless connectivity from within the same cell or cell sector. Such inter-dependent workgroups typically use a combination of wireless communication methods, including standard telephone calls, network-based instant connect communication and store and forward messaging systems. Since each base station has limited channel capacity for voice and data communication, the cell and the sectors of that cell are at risk for overload. Accordingly, if heavy traffic has caused most of the available channels of a particular base station to be in use, the transmission of a store and forward message intended for multiple recipients located in a single cell or cell sector may overwhelm the cell in which that base station operates, resulting in failed handoffs, dropped calls, inability to conduct instant connect calls, and unreliable transmission of certain types of messages.

BRIEF SUMMARY OF THE INVENTION

The methods disclosed herein can be used to balance the traffic load in a cell or a sector of a cell in a wireless network. Exemplary embodiments provide for receiving a message to be transmitted from a base station to a plurality of recipient devices, receiving numerous messages intended for a single recipient or receiving multiple messages for multiple recipients. These methods are particularly useful for store and forward messaging systems when, for example, a message is addressed to a number of recipient devices, that are all within a single cell sector. When traffic loads for that sector are at a peak, the base station may not be able to accommodate the number of message transmissions intended for the sector. During such a peak load situation, when it is determined that multiple intended recipient devices are within the same cell or cell sector, the message is transmitted from the base station to a first subset of the recipient devices. Thereafter, the message is transmitted to subsequent subsets of the plurality of recipient devices. Alternatively, if it is determined that numerous messages are intended for a single recipient, a subset of the messages is transmitted, and thereafter subsequent subsets of messages are transmitted to the recipient. In. this manner the load in the cell or cell sector is balanced in a timewise manner so as to avoid overload. Additionally, rather than only using these methods in a reactive way when the cell or cell sector is nearing overload, the invention may be practiced preventatively to assist in avoiding peak traffic loads altogether.

In one embodiment, the load balancing is performed by determining that multiple recipient devices are located within a single cell sector and obtaining information specifying load parameters of the sector. Based on the load parameters, a first subset of the recipient devices that can be simultaneously accommodated is identified. The message is then transmitted through the base station to the first subset of the recipient devices. Thereafter, the message may be transmitted to a second subset of the recipient devices that can also be simultaneously accommodated by the base station. This process continues until all of the intended recipients within the signaling range of the base station have received the message.

These methods are particularly suitable for messages that can be time-shifted without loss of usefulness for the sender or recipient. For instance, store and forward messaging service messages often do not require immediate responses. Accordingly, store and forward messages such as MMS and instant voice messages that are subjected to the load balancing methods disclosed herein are generally delayed only briefly and are delivered to the recipient within a period of time that is short enough that they maintain their usefulness. With store and forward messaging, it is common for a single message to be sent by a sender to multiple recipients. Moreover, this often occurs in situations where multiple recipients are in the same cell sector, and the number of intended message transmissions exceeds the number that can be simultaneously transmitted because of the current load in that cell sector. In these situations, the methods disclosed herein can cause the message(s) to be delivered to all recipients in a way that does not overload the cell sector.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It should be appreciated that these drawings depict only typical embodiments of the invention, and are therefore not to be considered limiting of its scope. The invention will be described and explained with additional specificity and detail through the use of the accompanying drawings in which.

DETAILED DESCRIPTION OF THE PREFERRED EMBODIMENTS

The present invention extends to methods and systems for load balancing the traffic in a cell or a cell sector in a wireless communication network. The present invention extends to any wireless network wherein store and forward messaging systems are in use. Examples of such messages include multimedia messaging service (MMS) messages, or instant voice messages that are created by the sender and transmitted to the recipient for delivery and use after the time that they were created.

While the methods disclosed herein can be used for a variety of messages, they are particularly suited for use with store and forward messages that can be delayed or time-shifted without significantly reducing the value of the messages to the senders or the recipients. As previously noted, MMS messages and instant voice messages represent examples of store and forward messaging systems that are well suited for use with the load balancing methods disclosed herein. Instant voice messages are created by senders and are caused to be sent to recipients without requiring the sender to first attempt to establish a live telephone call with the recipient. Such messages can be created and delivered to recipients without the risk of interrupting the recipients in an intrusive manner. Further details regarding such instant voice messages are included in U.S. patent application Ser. No. 10/407,955, filed Apr. 3, 2003, which is incorporated herein by reference.

1. Exemplary Network Environment

Figure 1:
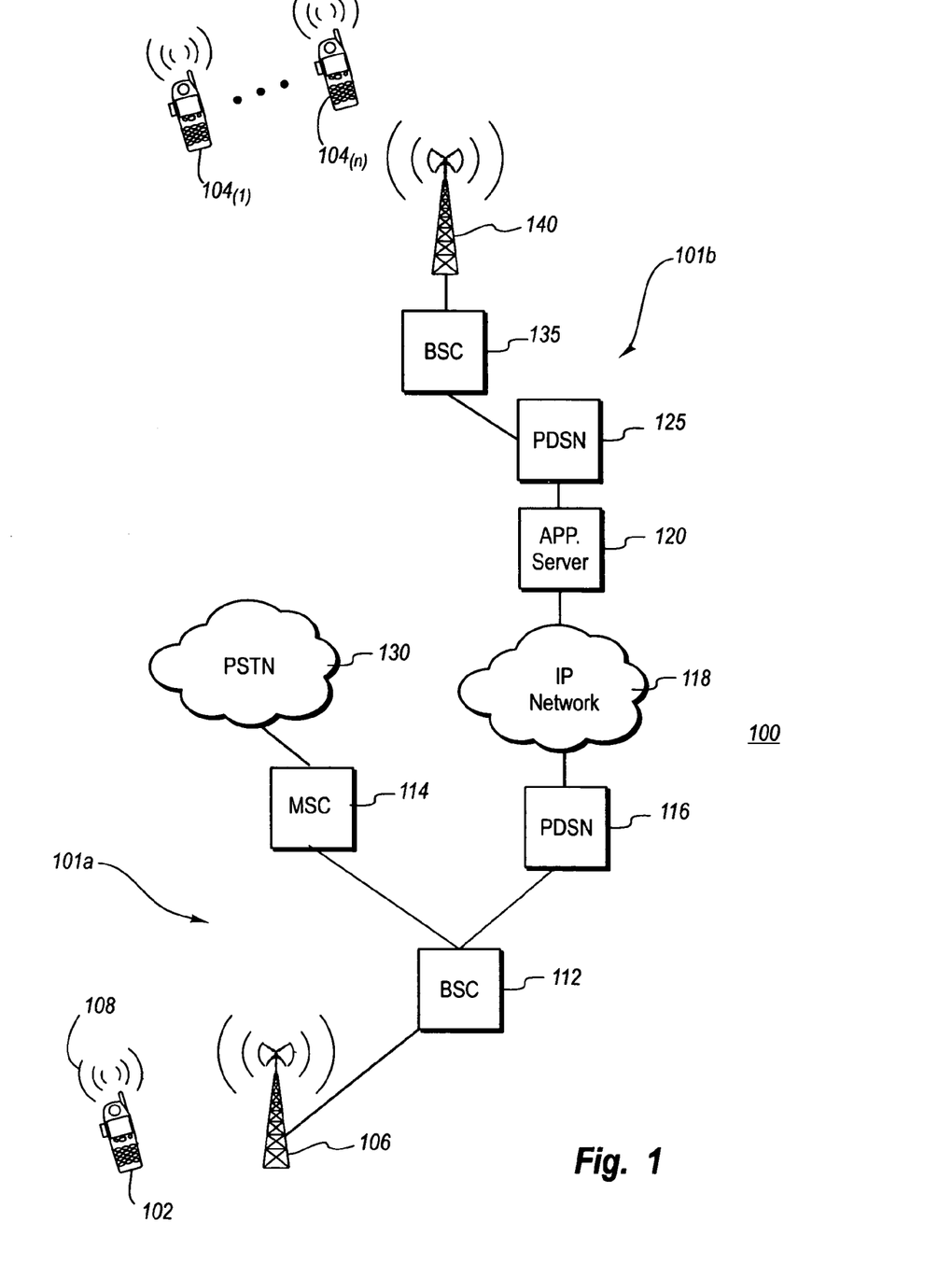
FIG. 1 illustrates a block diagram of a wireless network in which communication systems such as store and forward messaging systems may be practiced in conjunction with the invention.

In order to describe the various embodiments of the methods and systems disclosed herein, FIG. 1 illustrated an example of a network 100 in which the methods and systems can be practiced. The network of FIG. 1 represents only an example of a suitable operating environment, and other network architectures are possible, including those that incorporate wireline communication. Network 100 includes one or more wireless telephone networks that operate with wireless devices 102 and $104_{(1)}$-$104_{(n)}$. In the illustrated example, device 102 operates within cellular network 101a, while devices $104_{(1)}$-$104_{(n)}$ operate within the same cell sector of cellular network 101b. It is noted, however, that example embodiments also allow for cellular device 102 and cellular devices $104_{(1)}$-$104_{(n)}$ to operate within the same cellular network and within the same cell or cell sector. Cellular device 102 and cellular devices $104_{(1)}$-$104_{(n)}$ can be adapted for use with store and forward messaging systems, such as, MMS, and instant voice messaging systems, or any other type of communication that can be delayed as necessary.

In accordance with FIG. 1, base station 106 and cellular network 101a communicate with wireless device 102 by transmitting and receiving radio signals 108. Base station 106 and other base stations in network 111a operate over respective regions or cells within which the radio signals 108 are sufficiently strong to provide reliable communication. In cellular networks, a grid of partially overlapping cells is positioned in a geographical area to provide service for the wireless devices anywhere in the range of the cells. Each cell is served by a base station and the cell may be divided into sectors. Base station 106 may operate under the control of associated base station controllers 112, which may in turn be coupled with a packet data serving node (PDSN) 116. Base station 106 may also communicate with a mobile switching center 114, which enables device 102 to communicate with the public switched telephone network (PSTN) 130. Devices 102 and 104$_{(1)}$-104$_{(n)}$ may also communicate with a home agent and a foreign agent as needed.

In network 100 of FIG. 1, wireless device 102 may acquire radio connectivity and IP network connectivity in a manner well-known in the art. For example, device 102 may issue an originating request to mobile switching center 114, which sends the request back to BSC 112. Base station controller (BSC) 112 then assigns a traffic channel to device 102, or it can forward the request to PDSN 116, which works with device 102 to establish a data link by which communication data is transmitted to and received from the device. Device 102 may then initiate and participate in a store and forward messaging service or other communication session with the assistance of a PDSN 116, which provides device 102 with a gateway to IP network 118. The voice and other data from device 102 is then delivered to an application server 120 (e.g., a multimedia message service central (MMSC) or an instant voice message server), which among other functionality may be responsible for managing, storing and scheduling voice and message data transmissions.

Example embodiments provide that when wireless device 102 sends a message across IP network 118 intended for multiple recipient devices 104$_{(1)}$-104$_{(n)}$, application server 120 is capable of recognizing that the message is destined for multiple recipients operating within the same cell sector. For instance, when application server 120 receives the message from 102 destined to the multiple devices 104$_{(1)}$-104$_{(n)}$, the application server 120 may itself determine or otherwise receive information that these recipient devices 104$_{(1)}$-104$_{(n)}$ are located within signaling range of base station 140, and that they are located within the same cell sector.

In one embodiment, store and forward messaging system resident on application server 120 may be hosted externally to a wireless operator's network. In this embodiment, when sender device 102 and recipient devices 104$_{(1)}$-104$_{(n)}$ login to the store and forward messaging application resident on application server 120 to send and receive messages, the devices may report to application server 120 the identity of the base station and cell sector serving them. In another embodiment, store and forward messaging system resident on application server 120 may be hosted within the wireless operator's network.

In this embodiment, application server 120 may receive from another element on the network the identity of the base station and cell sector serving recipient devices 104$_{(1)}$-104$_{(n)}$. For instance, when wireless devices 104$_{(1)}$-104$_{(n)}$ register with a home or foreign network, they can have the ability to identify the base station 140 for which they are in signaling range. The wireless devices 104$_{(1)}$-104$_{(n)}$ may relay this information to, e.g. a home agent, a foreign agent or another network element (not shown) that in turn communicates the base station identity and cell sector information to application server 120. Alternatively, the home agent or application server 120 may determine the identity of base station 140 and the cell sector to which the multiple recipient devices 104$_{(1)}$-104$_{(n)}$ are assigned, through any of various means well-known to those skilled in the art. Further, other example embodiments provide for updating the identity of the base station within signaling range of recipient devices 104$_{(1)}$-104$_{(n)}$ as wireless devices 104$_{(1)}$-104$_{(n)}$ roam from cell to cell. Again, such mobile communication techniques are well-known in the art and can be implemented through a number of various methods.

2. Load Balancing Principles and Rules

Once application server 120 recognizes a message as intended for multiple recipients 104$_{(1)}$-104$_{(n)}$ and locates at least a few of these recipients within a single cell sector, the application server 120 can attempt to balance the load of the sector by limiting the number of recipient devices 104$_{(1)}$-104$_{(n)}$ that will simultaneously receive the message. For instance, the application server 120 can receive or otherwise determine a load in the cell sector. This load rate can then be used to determine a maximum number of recipient devices (from among the total recipient devices 104$_{(1)}$-104$_{(n)}$ within that sector) that are to simultaneously receive the message. In other words, based on the load of the cell sector, application server 120 sequentially sends the message to subsets of the devices 104$_{(1)}$-104$_{(n)}$ in order to balance the load in that sector.

This exemplary load balancing embodiment can be illustrated in the following example. If there are fifty recipient devices 104$_{(1)}$-104$_{(50)}$ that are to receive a message from device 102 and all are within a single cell sector, application server 120 may determine or be otherwise informed that only five recipient devices are to receive the message at any one particular instance in time. Accordingly, application server 120 sends the message through PDSN 125 and BSC 135 to the base station 140 for a subset of five devices, e.g., 104$_{(1)}$-104$_{(5)}$ in the sector. After the five devices 104$_{(1)}$-104$_{(5)}$ have received the message, a next subset of five devices in the sector, e.g., 104$_{(6)}$-104$_{(10)}$, may receive the message from base station 140 via application server 120. Application server 120 continues sending the message to subsets of the fifty recipients in this fashion until all fifty recipients have received the message.

The subset of recipients that are to receive the message simultaneously may be statically defined. For instance, a system administrator may determine that for a particular cell sector only a predetermined number of store and forward messages should be simultaneously transmitted to a sector at any given time. The rules governing the number of message transmissions allowed may be configured at the application level. For example, if a system administrator determines that five is the maximum number of simultaneous store and forward messages that should be transmitted to a sector, application server 120 may receive this information and send the message via base station 140 to a subset of only five of the recipient devices 104$_{(1)}$-104$_{(n)}$ at any given time. Application server 120 will then periodically continue to send the message to another five of the recipient devices via base station 140 until all of the recipient devices 104$_{(1)}$-104$_{(n)}$ have received the message. In another embodiment the transmission rules may be configured at a network element, such as the PDSN 125, which then communicates the transmission rules to application server 120.

Alternatively, the load in a cell or a cell sector may be dynamically determined for the purpose of calculating the number of messages that can be simultaneously transmitted to a cell sector. For example, the application server 120 may receive information about the load capacity and existing load of the cell sector serving a number of intended recipient devices. Application server 120 may then dynamically calculate, based upon the load information, a subset of the recipient devices 104$_{(1)}$-104$_{(n)}$ that will simultaneously receive a message. For instance, if the load capacity of the cell sector allows transmission of thirty simultaneous messages, and the current load is ten messages, then the application server 120 may send the message to twenty of the total recipient devices $104_{(1)}$-$104_{(n)}$ at that particular instance in time. Of course, example embodiments allow application server 120 to be more conservative in limiting the load in a sector, e.g., by simultaneously sending the message via base station 140 to a subset of only five of the recipient devices $104_{(1)}$-$104_{(n)}$ at a time. In any event, the message may continue to be sent to fixed increments of recipient devices until all of the recipient devices $104_{(1)}$-$104_{(n)}$ have received the message.

Another technique involves calculating and updating the number of recipients to simultaneously receive the message for every subset of recipients that receive the message. For example, application server 120 may calculate or otherwise be informed that a first subset of five of the total recipient devices $104_{(1)}$-$104_{(n)}$ should receive a message via base station 140. When the message has been transmitted to the first subset, the application server 120 may calculate (based on the updated load information at that time) that a next subset of, for instance, ten of the recipient devices $104_{(1)}$-$104_{(n)}$ should receive the message. As before, application server 120 may continue in this fashion until all of the intended recipient devices $104_{(1)}$-$104_{(n)}$ receive the message.

In practice, the recipients of the messages may experience a small delay in the receipt of the messages. Depending, however, on the nature of the messages, this delay may not be perceived by the recipient, or the delay, if noticed, may be sufficiently small so as to not adversely affect the usefulness of the message to the sender or the recipient. For example, when the load associated with store and forward messaging services is balanced, some of the recipients receive messages that have been delayed by a few minutes. However, multimedia message service (MMS) messages and instant voice messages are generally intended to be received and played by the recipient at a time after the creation of the messages. In these examples, the recipient is unlikely to notice any delay in the receipt of such messages as a result of having applied the load balancing techniques of the invention.

Various rules can be applied to determine which messages are to be delayed or which recipients are to be given priority when determining how and when to delay a message in the load balancing methods disclosed herein. These rules can be based on the type or data content of the messages themselves or on a service level associated with the recipients' subscription plans. For instance, certain types of store and forward messages (e.g., instant voice messages, MMS messages) can be given higher priorities than other.

3. Exemplary Load Balancing Methods

Figure 2:
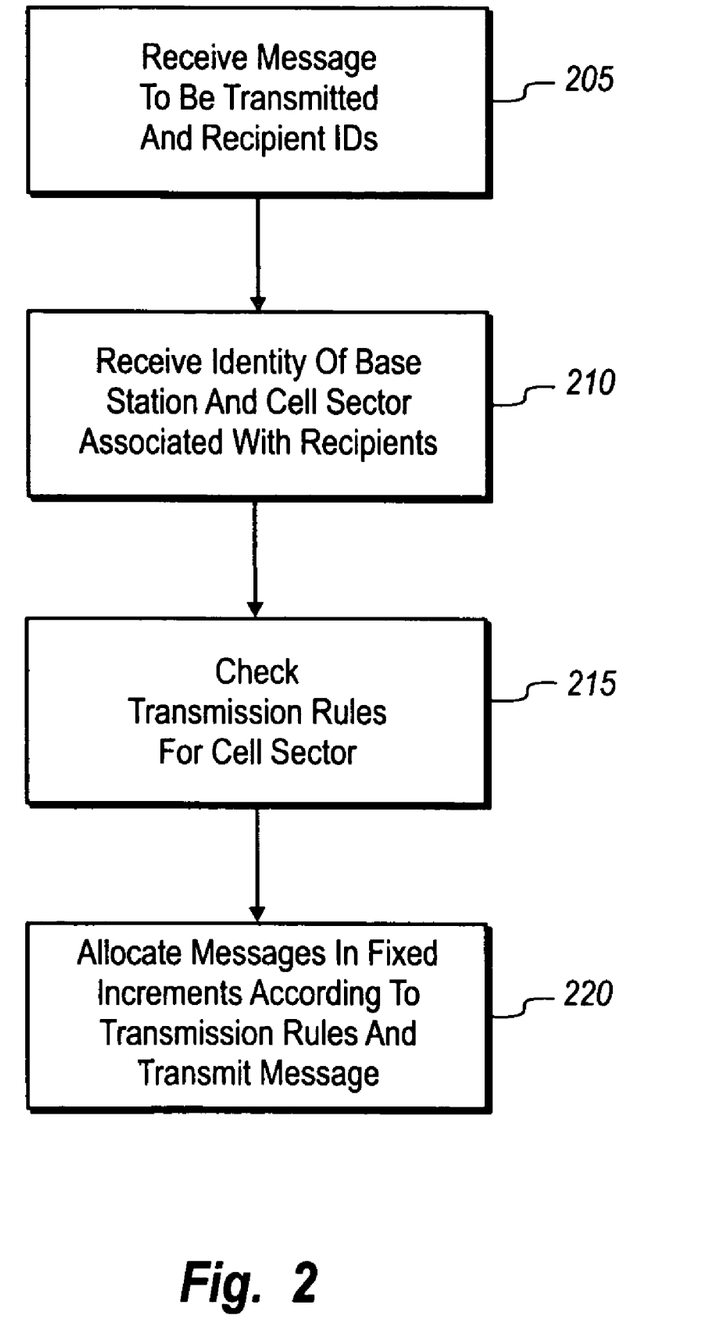
FIG. 2 illustrates a flow diagram for balancing a traffic load in a cell or cell sector in accordance with example embodiments.

FIG. 2 illustrates a flow diagram of a method for balancing a traffic load in a cell sector in accordance with example embodiments. In particular, this diagram illustrates load balancing a cell sector in accordance with predetermined message transmission rules when a single message is intended to be received by a plurality of recipients. According to this method, a message is received by application server 120 in act 205 for transmission via a base station to a plurality of recipient devices located within the same cell sector. The message, along with the recipient device identifiers, may be stored for some period of time on application server 120 before transmission. In step 210, application server 120 receives information about the identity of the base station and cell sector serving the plurality of recipient devices. In step 215, application server 120 checks for information about the preconfigured transmission rules for that cell sector. The application server 120 then allocates the message in accordance with the preconfigured transmission rules of that cell sector to a subset of the recipient devices. In this embodiment, the allocation is a fixed number, meaning that each subset of recipient devices comprises a fixed, maximum increment of recipient devices to which the message can be transmitted simultaneously. The allocated messages are then transmitted in act 220 from the application server 120 to a first subset of the plurality of subsequent subsets of a plurality of recipient devices in order to balance the load of the base station.

The transmission of the message to the second subset or other subsets of recipients may be initiated at a predetermined, fixed time after the transmission of the messages to the first subset is initiated. Other embodiments provide, however, for the transmission of the message to the second subset (or subsequent subsets) after the message has been completely transmitted to the first subset.

Figure 3:
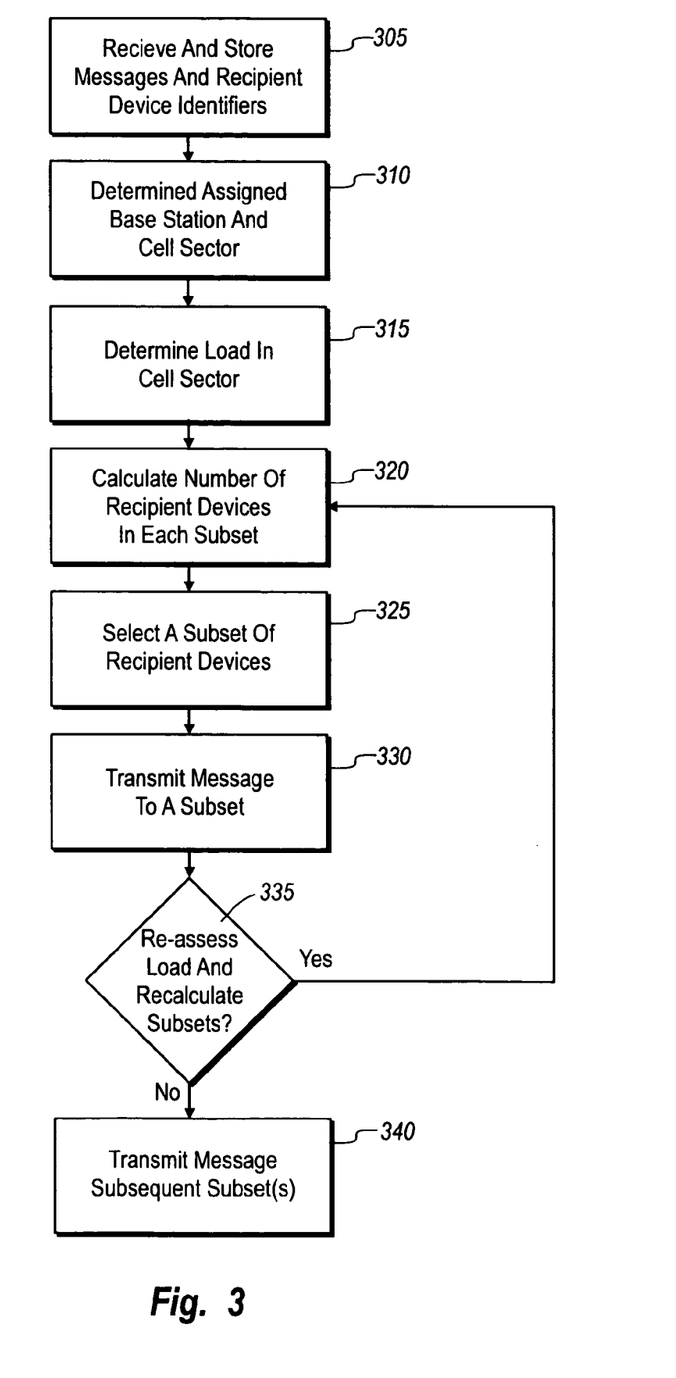
FIG. 3 illustrates a flow diagram of balancing a traffic loud in a cell or cell sector according to example embodiments.

FIG. 3 illustrates yet another exemplary flow diagram of a method for balancing a load in a cell sector. A plurality of recipient device identifiers and a store and forward message comprising voice and other data are stored in application server 120 in act 305. The plurality of recipient device identifiers correspond to a plurality of wireless devices. A base station and cell sector to which the plurality of intended recipient devices is assigned are determined in act 310. Further, a traffic load in the assigned cell sector may be determined or otherwise received by application server 120 in act 315. Based on the determined load, a number of recipient devices that can receive the message without overloading the cell sector is calculated in act 320. The calculated number of recipients is no greater than the plurality of recipient device identifiers. From the plurality of recipient device identifiers, a first subset of recipient device identifiers proportional to the calculated number of recipient devices is selected in act 325. The load in the cell sector is then balanced in act 330 by sending the message and selected first subset of recipient device identifiers to the base station. The message and fixed subsets of recipient device identifiers are successively sent in act 335 to the base station until all of the wireless devices receive the message.

In another embodiment the load in the cell sector may be re-assessed and the subsets recalculated periodically during the transmission process to accommodate fluctuations in capacity. After re-assessing traffic load, the subset size may be increased or decreased according to the updated traffic load information. As mentioned above, the transmission of the message to the second subset and any subsequent subsets may be initiated after a predetermined fixed period of time, or alternatively may be initiated after the message has been completely transmitted to the first subset. In any event, the message may be transmitted to a plurality of subsets successively until all of the plurality of recipients have received the message.

The methods of FIGS. 2 and 3 have been described primarily in the context of a one-to-many message that is sent by a single sender to multiple recipient devices that are located in a single cell or cell sector. However, the principles of the invention and the methods of FIGS. 2 and 3 can also be applied to a set of messages sent by multiple senders to a single recipient (many-to-one), a set of messages sent by multiple senders to multiple recipients in the same cell or cell sector (many-to-many), or a set of messages sent by a single sender to a single recipient (one-to-one).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a wireless communication network that includes a plurality of base stations, each base station providing wireless connectivity to different recipient devices, a method of balancing a traffic load on a base station included in the plurality of base stations, comprising:
   a server receiving a message at a server to be transmitted to a plurality of wireless recipient devices, wherein the server is configured to communicate with the plurality of wireless recipient devices using base stations included in a network; wherein the server connects an (Internet Protocol) IP network to a base station and is configured to process at least IP based traffic,
   the server determining that the plurality of wireless recipient devices are operating with the same base station;
   the server identifying the base station serving the plurality of wireless recipient devices from among the different base stations, wherein the plurality of wireless recipient devices derive wireless connectivity from the base station;
   the server determining a current traffic load of the base station; and
   the server balancing the traffic load of the base station by:
      transmitting the message via the base station to a first subset of the plurality of recipient devices based on the current traffic load; and thereafter
      transmitting the message to one or more subsequent subsets of the plurality of recipient devices, based on the traffic load, to balance the traffic load on the base station, wherein the first subset of the plurality of recipient devices is less than or equal to the number of wireless recipient devices that can receive the message without overloading the base station.

2. The method of claim 1, further comprising determining load restrictions of the base station, wherein the number of recipient devices in the first subset and the one or more subsequent subsets is based on the determined load restrictions.

3. The method of claim 2, further comprising successively transmitting the message to subsets of the plurality of recipient devices until all of the plurality of recipient devices have received the message.

4. The method of claim 1, wherein the transmission of the message to a next subset of the one or more subsequent subsets is initiated at a predetermined fixed time after transmission of the message to the first subset is initiated.

5. The method of claim 1, wherein transmission of the message to a next subset of the one or more subsequent subsets is initiated after the message has been completely transmitted to the first subset.

6. The method of claim 1, wherein the message comprises a store and forward message.

7. The method of claim 6, wherein the store and forward message comprises an instant voice message.

8. The method of claim 6, wherein the store and forward message comprises a multimedia messaging service message.

9. The method of claim 6, wherein the store and forward message includes voice data.

10. The method of claim 6, wherein the store and forward message includes multimedia data.

11. The method of claim 6, wherein the message comprises a notification that a recipient has another message stored on a server.

12. The method of claim 1, wherein the plurality of recipient devices includes a number of recipient devices within the signaling range of the base station that is larger than the number of recipient devices to which the base station is capable of simultaneously transmitting the message.

13. The method of claim 1, wherein:
   identifying the base station comprises identifying a single cell sector of a cell served by the base station, wherein the plurality of recipient devices are located in the single cell sector; and
   transmitting the message via the base station to the first subset and thereafter transmitting the message to the one or more subsequent subsets is performed to balance the load on the single cell sector.

14. The method of claim 13, wherein the number of recipient devices included in the first subset and in the one or more subsequent subsets are determined using transmission rules associated with the cell sector.

15. The method of claim 13, further comprising:
   determining the number of recipient devices included in the first subset using load information specifying the load on the cell sector;
   obtaining updated load information specifying the load on the cell sector; and
   determining the number of recipient devices included in a next subset of the one or more subsequent subsets using the updated load information.

16. The method of claim 15, wherein the number of recipient devices included in the first subset is different from the number of recipient devices included in the next subset.

17. The method of claim 1, wherein
   the base station serves a cell that is not sectorized; and
   transmitting the message via the base station to the first subset and thereafter transmitting the message to the one or more subsequent subsets is performed to balance the load on the cell.

18. The method of claim 1, wherein the recipient devices included in the first subset and the recipient devices included in the one or more subsequent subsets are selected based on a service level associated with a subscription of users of the recipient devices.

19. In a wireless communication network that includes multiple base stations communicating with different wireless recipient devices, a method of balancing a traffic load on a base station of the network, the method comprising:
   a server logging in a wireless sending device and a plurality of wireless recipient devices to a store and forward messaging application, wherein the wireless sending device and the plurality of wireless recipient devices report a base station providing service to the wireless sending device and the plurality of wireless recipient devices using device identifiers, and wherein the server is connected with an IP (Internet Protocol) based network and configured to process at least IP based traffic;
   the server receiving a message from the wireless sending device to be transmitted to the plurality of wireless recipient devices and receiving the recipient device identifiers along with the message;
   the server recognizing that the plurality of wireless recipient devices are operating with the same base station based on the received identifiers;

the server receiving current traffic load information for the base station, the traffic load information associated with a number of messages being transmitted by the base station;

the server calculating a number of wireless recipient devices that can receive the message without overloading the base station using the current traffic load; and the server transmitting the message via the base station to a first subset of the plurality of wireless recipient devices and thereafter transmitting the message to one or more subsequent subsets of the plurality of wireless recipients to balance the load on the base station using the recipient device identifiers, wherein the first subset of the plurality of wireless recipient devices is less than or equal to the number of wireless recipient devices that can receive the message without overloading the base station.

20. The method of claim 19, wherein transmission of the message to a next subset of the one or more subsequent subsets is initiated at a predetermined fixed time after transmission of the message to the first subset.

21. The method of claim 19, wherein transmission of the message to a next subset of the one or more subsequent subsets is initiated after the message has been completely transmitted to the first subset.

22. The method of claim 19, further comprising successively transmitting the message to subsets of the plurality of recipient devices until all of the plurality of recipient devices have received the message.

23. The method of claim 19, wherein the message comprises a store and forward message.

24. The method of claim 19, wherein the plurality of recipient devices includes a number of recipient devices within the signaling range of the base station that is larger than the number of recipient devices to which the base station is capable of simultaneously transmitting the message.

25. The method of claim 19, wherein receiving information that the plurality of recipient devices are located within signaling range of a base station comprises receiving information that the plurality of recipient devices are located within a single cell sector of a cell served by the base station.

26. The method of claim 25, wherein the number of recipient devices included in the first subset and in the one or more subsequent subsets are determined using transmission rules associated with the cell sector.

27. The method of claim 25, wherein the number of recipient devices included in the first subset and in the one or more subsequent subsets are determined by an application server operating in the wireless communication network.

28. The method of claim 25, wherein the number of recipient devices included in the first subset and in the one or more subsequent subsets are determined a network layer component operating in the wireless communication network.

29. The method of claim 19, wherein the base station serves a cell that is not sectorized.

30. The method of claim 19, wherein a maximum number of store and forward messages that may be transmitted simultaneously by a single sender to recipients in a single cell sector of the base station is predetermined.

31. The method of claim 19, wherein:
the specified load is predetermined; and
the number of recipient devices that can receive the store and forward message without exceeding the specified load is determined dynamically.

32. In a wireless communication network that includes multiple cells, each cell having at least one cell sector that communicates with wireless devices, a method of balancing a traffic load in a particular cell, the method comprising:

a server receiving a plurality of messages to be transmitted to one or more wireless recipient devices, wherein the server is part of an Internet Protocol (IP) network and is configured to process at least IP based traffic;

the server determining a base station and a cell sector assigned to the one or more wireless recipient devices that derive wireless connectivity from the cell sector;

the server determining that the plurality of messages are destined for the one or more wireless recipient devices operating within a particular cell sector;

the server determining a current traffic load of the particular cell sector;

the server determining a first subset of messages that can be transmitted to the one or more wireless recipient devices without overloading the particular cell sector based on the determined current traffic load;

the server transmitting the first subset of the messages via the base station to the one or more wireless recipient devices while storing one or more other subsets of the messages; and the server transmitting the one or more subsequent subsets of the messages to the one or more recipient devices to balance the traffic load on the particular cell sector and base station.

33. The method of claim 32, wherein the plurality of messages have been sent by a single sender to a single recipient device.

34. The method of claim 32, wherein the plurality of messages have been sent by a single sender to multiple recipient devices.

35. The method of claim 32, wherein the plurality of messages have been sent by multiple senders to a single recipient device.

36. The method of claim 32, wherein the plurality of messages have been sent by multiple senders to multiple recipient devices.

37. The method of claim 32, wherein the messages included in the first subset and the messages included in the one or more subsequent subsets are selected based on a message type of the messages or content of the messages.

* * * * *

UNITED STATES PATENT AND TRADEMARK OFFICE
CERTIFICATE OF CORRECTION

PATENT NO. : 7,272,400 B1
APPLICATION NO. : 10/742703
DATED : September 18, 2007
INVENTOR(S) : Konstantin Othmer It is certified that error appears in the above-identified patent and that said Letters Patent is hereby corrected as shown below:

Column 3
Line 9, after "In" remove |.|

Column 4
Line 4, change "loud" to --load--
Line 39, change "illustrated" to --illustrates--
Line 61, change "111a" to --101a--

Column 5
Line 57, after "e.g." insert --,--

Signed and Sealed this

Fifteenth Day of July, 2008

JON W. DUDAS
*Director of the United States Patent and Trademark Office*